Jan. 6, 1942.  K. KÜHNEMANN  2,269,374
APPARATUS FOR MEASURING THE DISTANCE OF AN AIRPLANE ABOVE THE EARTH
Filed April 26, 1940
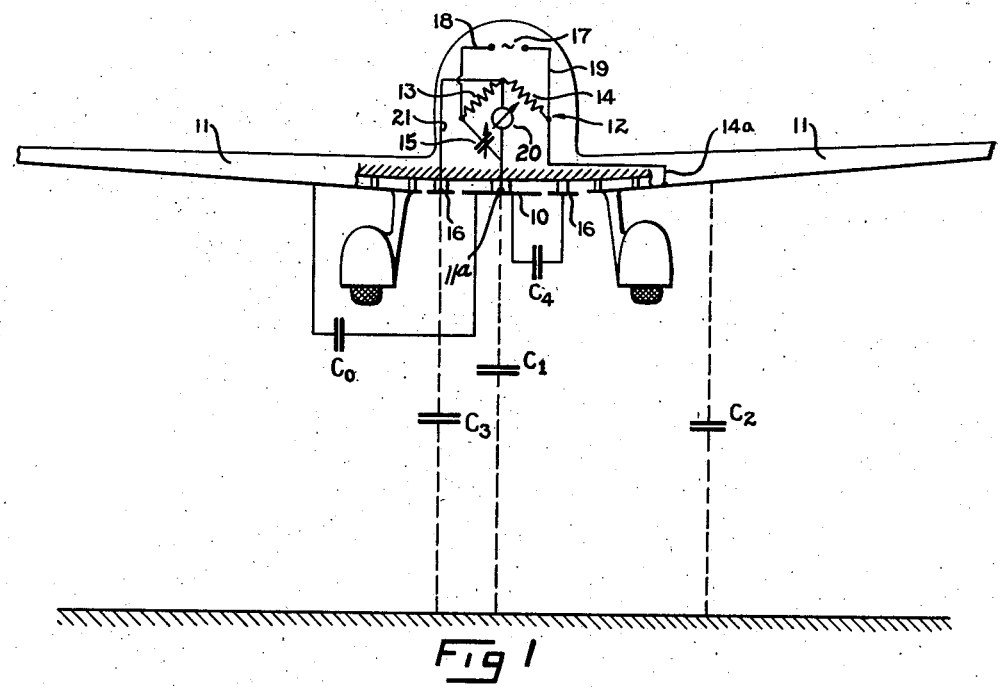
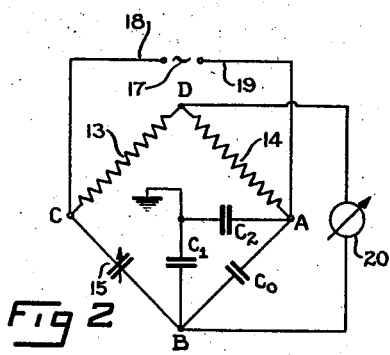
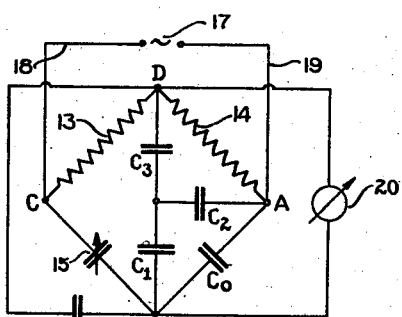
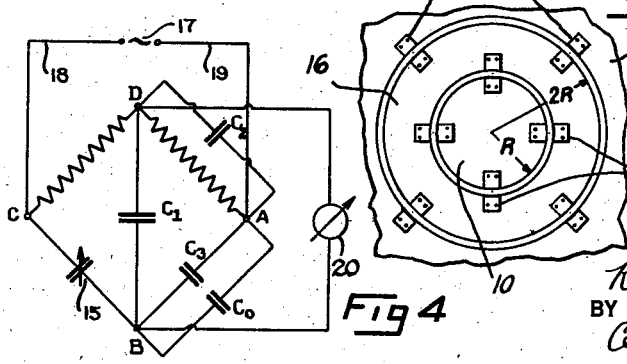
INVENTOR.
Karl Kühnemann
BY
Cerstvik and Kalman
ATTORNEYS.

Patented Jan. 6, 1942

2,269,374

UNITED STATES PATENT OFFICE 2,269,374

APPARATUS FOR MEASURING THE DISTANCE OF AN AIRPLANE ABOVE THE EARTH

Karl Kühnemann, Berlin-Siemensstadt, Germany, assignor to Siemens Apparate und Maschinen Gesellschaft mit beschränkter Haftung, Berlin, Germany, a corporation of Germany Application April 26, 1940, Serial No. 331,892
In Germany April 27, 1939

4 Claims. (Cl. 177—352)

This invention relates to means for measuring the distance of an object above the earth, and more specifically to means for accurately determining the height of an aircraft above the ground by measuring the electrostatic capacity (capacitance) of a condenser formed by the craft, means carried thereby, and the ground, which capacitance varies in inverse proportion to the changes in altitudes of the aircraft.

Devices have previously been employed for determining aircraft altitudes by capacitance measurements, but such prior devices have involved the installation and employment of at least two conductors (condenser "plates") attached to the wings or body of the aircraft, but insulated therefrom, and conformed to the wing surfaces in such a manner as not to offer any air resistance. The invention herein proposed and hereinafter described, by an original method of installing only one conductor ("plate"), and by an original method of providing for accurate measurements, will result in the marked advantage of increased simplicity of installation at a lower cost. The use of a single conductor will be a great advantage from a production viewpoint, inasmuch as the installation difficulties will be materially reduced. Furthermore, the proposed invention facilitates the taking of altitude measurements, and will be highly accurate.

This proposed invention involves the use of the so-called bridge method of measurement of electrostatic characteristics—in this case, capacitances—of the condenser formed by the aircraft and the ground, by a novel and original adaptation of this well-known method.

One of the objects of the present invention is to provide a novel capacitance altimeter which is light in weight and easy to install.

A further object is to provide a novel capacitance apparatus for measuring the distance of an aircraft from the earth's surface, which apparatus is highly accurate.

Another object is to provide a simplified capacitance device of the above character.

The above and additional objects and original features of this device will be more fully revealed in the following description and the appended drawing. The drawing, however, is submitted with the object of illustration and simplification of the explanation only, and is not to be construed as circumscribing the possibilities of the employment of this invention, or limiting the manner in which it may be mounted on an aircraft.

In the drawing, in which like reference characters refer to like parts throughout, Fig. 1 is a diagrammatic representation with parts broken away of one embodiment of the invention mounted on an aircraft;

Figs. 2, 3 and 4 are schematic illustrations, or wiring diagrams, representing progressive steps—for purposes of explanation—in capacitance measurements by the bridge method, specifically as regards the modification of this method in the present invention; and, Fig. 5 is a fragmentary top plan view of the arrangement of the screen element with the condenser plate and the aircraft wing.

In Fig. 1, a condenser plate 10 which may be a flat conductor, a rod, or of other suitable form such as a circular plate 10 shown in Fig. 5 is mounted upon and insulated from an aircraft 11 by way of suitable insulating means 11a shown in Fig. 1. The earth itself constitutes a second plate, and the intervening air the non-conducting medium or dielectric between. The body of the plane constitutes yet another "plate," so that considering from flat conductor on plane to earth, and from earth back to aircraft body proper, two condensers are thereby formed, connected with one another in series, the dielectric of both condensers being air. Since the capacitance of a condenser is an inverse function of the distance between the plates (such distance in this case being the height of the craft above the ground) as the height is doubled, the capacitance is halved, and so on—it follows that a measurement of the capacitance of one or both of the condensers under consideration as the craft rises or descends will give an accurate index to the altitude of the aircraft.

Means for measuring the capacitance of these condensers is provided, and is one of the features of this invention. This means comprises a conventional bridge measuring device of four arms or branches, two of said arms 13 and 14 containing resistances or impedances of fixed and known electrical characteristics. A third arm contains a variable condenser 15, preferably a precision instrument such as a turning plate condenser, one terminal being connected to a terminal of the arm 13, and the other to the flat conductor 10. The fourth and last arm of the bridge comprises a connection 14a between arm 14 and the aircraft body proper, the current flow in this arm travelling from aircraft body to earth, thence back to the flat conductor, thence to corner of the bridge where the leads of the receiver or galvanometer 20 and variable condenser 15 join. A screen 16, the purpose of which will be made clear later, is provided for conductor plate 10, and a suitable source of electromotive force is led to diametrically opposite corners of the bridge by connections 18 and 19.

A telephone receiver, vibration galvanometer, or other suitable instrument for indicating the presence or absence of an electromotive force, is connected across bridge corners B and D (Fig. 2). Instrument 20 will hereinafter be referred to as the receiver.

When such a bridge is "balanced," that is, the variable condenser 15 is so adjusted that no sound is heard in the receiver, thus indicating zero difference of potential between corners B and D, the impedances in the four arms bear a definite mathematical ratio to each other. Considering, for example, Fig. 2, and denoting the resistances of the two arms 13 and 14 as $R13$ and $R14$, respectively, and the capacitances of the other two arms as $Cab$ and $Cbc$, then $$\frac{Cbc}{Cab} = \frac{R13}{R14}$$

Inasmuch as the characteristics of the two resistance arms are fixed, the amount of adjustment of the variable condenser 15 will be proportional to the change of capacitance of the fourth arm AB, which change is caused by a variation in the altitude of the aircraft. The variable condenser may be adjusted at the will of the operator to effect this balance. When this condition is established, it follows that the the change in capacitance of the variable condenser will also be a function of the change in altitude. The variable condenser may be provided with a scale, calibrated, not in electrical, but in lineal units (feet, yards, or meters) so that the altitude is indicated immediately the bridge is balanced.

The preceding paragraph sets forth the fundamental principle upon which the operation of this invention is based. For a detailed explanation of the novel adaptation of this principle, consider, first, Fig. 2. Assume for the present, for purposes of simplicity only, that the screen 16 is not provided. Conductor 10 is attached to the aircraft body, but insulated therefrom. If $C_1$ denotes the capacitance of the condenser formed by this conductor and the earth, and $C_2$ that of the condenser formed by the aircraft body and the earth, the two capacitances $C_1$ and $C_2$ are connected in series across the AB arm of the bridge as shown in the figure. Paralleling these is a third capacitance, denoted by $C_0$, which is the capacitance of the condenser formed by conductor 10 and aircraft body 11 directly with each other, and not by way of the earth—a condenser which is an inherent characteristic of this type of mounting. This capacitance, $C_0$, is fixed, and is relatively large on account of the short distance between its "plates." Returning to capacitances $C_1$ and $C_2$, the capacitance $C_2$ is very great as compared to $C_1$, since capacitances are a function of plate areas, and the area of the body 11 is large as compared with the area of the conductor 10. As the plane rises or descends, both $C_1$ and $C_2$ are affected similarly, and both decrease or increase by the same percentage, but since $C_1$ is so much smaller, it will exert the preponderant influence, and to such a degree that for all practical purposes the quantity $C_2$ may be disregarded entirely. This may best be understood if it is considered that a very large capacitance offers little or no opposition to the passage of a current, whereas a small capacitance offers a great opposition. $C_2$ is large enough, where increased or decreased, to permit a relatively free passage, and consequently the capacitance $C_1$ will control the current in the $C_1$ $C_2$ branch of the arm AB. Disregarding $C_2$ then, the total capacitance of the arm AB is $C_1 + C_0$, (two condensers in parallel). Since the quantity $C_0$ is independent of the altitude, the relative change of the total capacitance of the arm AB may therefore be expressed as $$\frac{\Delta C_1}{C_0 + C_1}$$

which, since $C_1$ is relatively small, becomes $$\frac{\Delta C_1}{C_0}$$

It is obvious that, since $C_0$ is so much greater than $C_1$, the influence exerted by a change in $C_1$ (caused by altitude variation) upon the large quantity $C_0$ must be relatively small.

In order to permit changes in $C_1$ to exert a greater influence upon $C_0$, and hence to be more readily measured, it is necessary to reduce $C_0$. This can be effected by mounting the conductor 10 upon a screen 16 by way of suitably insulated brackets 30, shown in Fig. 5, which is larger in area than the conductor, said screen being disposed between conductor 10 and secured to the airplane body at a cutout wing portion thereof by way of suitably insulated brackets 31 shown in Fig. 5. The capacitance $C_4$ of the condenser formed by the screen as one "plate" and the conductor 10 the other, which necessarily arises in this plan of mounting, is connected across the same bridge corners as the receiver. As these corners are points of zero potential when the bridge is balanced, $C_4$ can consequently exert no influence as far as the balance is concerned, and will henceforth be disregarded.

In case the area of screen 16 is twice the area of the conductor 10, the ratio $$\frac{\Delta C_1}{C_0}$$

is approximately doubled, as compared with the condition if no screen were used. This means that any change of $C_1$ will exert a proportionately greater influence, and can consequently be more accurately measured.

The capacitance $C_1$ can also be materially reduced by installing the plate 10, not as a flat conductor, but as a rod of more or less cylindrical shape, partly surrounded by the screen.

The introduction of the screen 16 creates a third condenser with the earth, this capacitance being denoted by $C_3$. Fig. 1 diagrammatically illustrates a mechanical embodiment of the three condensers $C_1$, $C_2$ and $C_3$, and Fig. 3 their disposition in the bridge circuit, in the Y or star connection.

For purpose of explanation, consider Fig. 4. Here is represented, not the actual connection of the condensers in the circuit (this is shown in Fig. 3), but a delta connection, or "equivalent triangle," which is electrically equivalent to the star connection of Fig. 3. This transposition has been in accordance with a well-known transformation formula.

In Fig. 4, the capacitance $C_1$ is parallel to the receiver, and $C_2$ is parallel to one resistance arm of the bridge, and both are accordingly ineffective. Only the capacitance $C_3$ is effective. However, it may be shown that $C_3$ is substantially equal at all times to $C_1$, for, considering the transformation formula, the conductance of one triangle side is equal to the product of the conductances of the other two sides, divided by the sum of the three conductances. Hence $$C_3 = \frac{C_1 \times C_2}{C_1 + C_2 + C_3}$$

since capacitances are a direct function of conductances. Since, however, $C_2$ is very large as compared to $C_1+C_3$, the expression $C_1+C_2+C_3$ is approximately equal to $C_2$. Hence $$C_3 \cong \frac{C_1 \times C_2}{C_2}$$

or $C_3 \cong C_1$. Therefore, the full capacitance change of the conductor 10 is effective in the bridge circuit, and may be accurately measured by the bridge.

What is claimed is:

1. In apparatus for determining the distance of an aircraft above that portion of the earth's surface directly below the craft, an electrical bridge arrangement having two joining arms thereof provided with resistor means, a variable condenser in a third arm of said bridge joining with a free end of one of said first two arms, condenser means having one plate thereof defined by a conductor mounted on said craft and the other plate thereof by the earth's surface directly below said craft, means for screening said conductor from said craft thus preventing the formation of another condenser between said conductor and said craft, said condenser means constituting a fourth arm of said bridge having one end thereof connected to the free end of said third arm and the other end thereof with the free end of the other of said first two arms, a source of current connected across a diagonal of said bridge, and current flow responsive means connected across another diagonal of said bridge whereby upon a variation in craft altitude said bridge is unbalanced causing current flow to said responsive means, said variable condenser being manually operable an amount proportional to the altitude of said craft to balance said bridge.

2. In apparatus for determining the distance of an aircraft above that portion of the earth's surface directly below the craft, an electrical bridge arrangement having two joining arms thereof provided with resistor means, a variable condenser in a third arm of said bridge joining with a free end of one of said first two arms, condenser means having one plate thereof defined by a conductor mounted on said craft and the other plate thereof by the earth's surface directly below said craft, a screen member between said conductor and said craft whereby another condenser is prevented from being formed between said conductor and the body of said craft, said condenser means constituting a fourth arm of said bridge having one end thereof connected to the free end of said third arm and the other end thereof with the free end of the other of said first two arms, a source of current connected across a diagonal of said bridge, and current flow responsive means connected across another diagonal of said bridge whereby upon a variation in craft altitude said bridge is unbalanced causing current flow to said responsive means, said variable condenser being operable an amount proportional to the altitude of said craft to balance said bridge.

3. In apparatus for determining the distance of an aircraft above that portion of the earth's surface directly below the craft, an electrical bridge arrangement having two joining arms thereof provided with resistor means, a variable condenser in a third arm of said bridge joining with a free end of one of said first two arms, condenser means having one plate thereof defined by a conductor mounted on said craft and the other plate thereof by the earth's surface directly below said craft, a screen member extending about said conductor and beyond the outer periphery of the conductor whereby another condenser is prevented from being formed between said conductor and the body of said craft, said condenser means constituting a fourth arm of said bridge having one end thereof connected to the free end of said third arm and the other end thereof with the free end of the other of said first two arms, a source of current connected across a diagonal of said bridge, and current flow responsive means connected across another diagonal of said bridge whereby upon a variation in craft altitude said bridge is unbalanced causing current flow to said responsive means, said variable condenser being operable an amount proportional to the altitude of said craft to balance said bridge.

4. In apparatus for determining the distance of an aircraft above that portion of the earth's surface directly below the craft, an electrical bridge arrangement having two joining arms thereof provided with resistor means, a variable condenser in a third arm of said bridge joining with a free end of one of said first two arms, condenser means having one plate thereof defined by a conductor mounted on said craft and the other plate thereof by the earth's surface directly below said craft, a screen member having an area greater than the area of said conductor extending about and beyond the outer periphery of said conductor whereby another condenser is prevented from forming between said conductor and the body of said craft, said condenser means constituting a fourth arm of said bridge having one end thereof connected to the free end of said third arm and the other end thereof with the free end of the other of said first two arms, a source of current connected across a diagonal of said bridge, and current flow responsive means connected across another diagonal of said bridge whereby upon a variation in craft altitude said bridge is unbalanced causing current flow to said responsive means, said variable condenser being operable an amount proportional to the altitude of said craft to balance said bridge.

KARL KÜHNEMANN.